Sept. 21, 1965 L. E. BROWN ETAL 3,208,017

CAVITY RESONATOR WITH MEANS FOR LOCKING TUNING PLUNGER

Filed April 8, 1963 2 Sheets-Sheet 1

INVENTORS
LAWRENCE E. BROWN
BRUCE C. MORLEY

BY Harry E. Aine
ATTORNEY

Sept. 21, 1965 L. E. BROWN ETAL 3,208,017

CAVITY RESONATOR WITH MEANS FOR LOCKING TUNING PLUNGER

Filed April 8, 1963 2 Sheets-Sheet 2

INVENTORS
LAWRENCE E. BROWN
BRUCE C. MORLEY
BY Harry E. Aine
ATTORNEY 3,208,017

CAVITY RESONATOR WITH MEANS FOR LOCKING TUNING PLUNGER

Lawrence E. Brown, Palo Alto, and Bruce C. Morley, Mountain View, Calif., assignors to Varian Associates, Palo Alto, Calif., a corporation of California Filed Apr. 8, 1963, Ser. No. 271,442
6 Claims. (Cl. 333—83)

Figures 1, 2, 3, 4, 5:
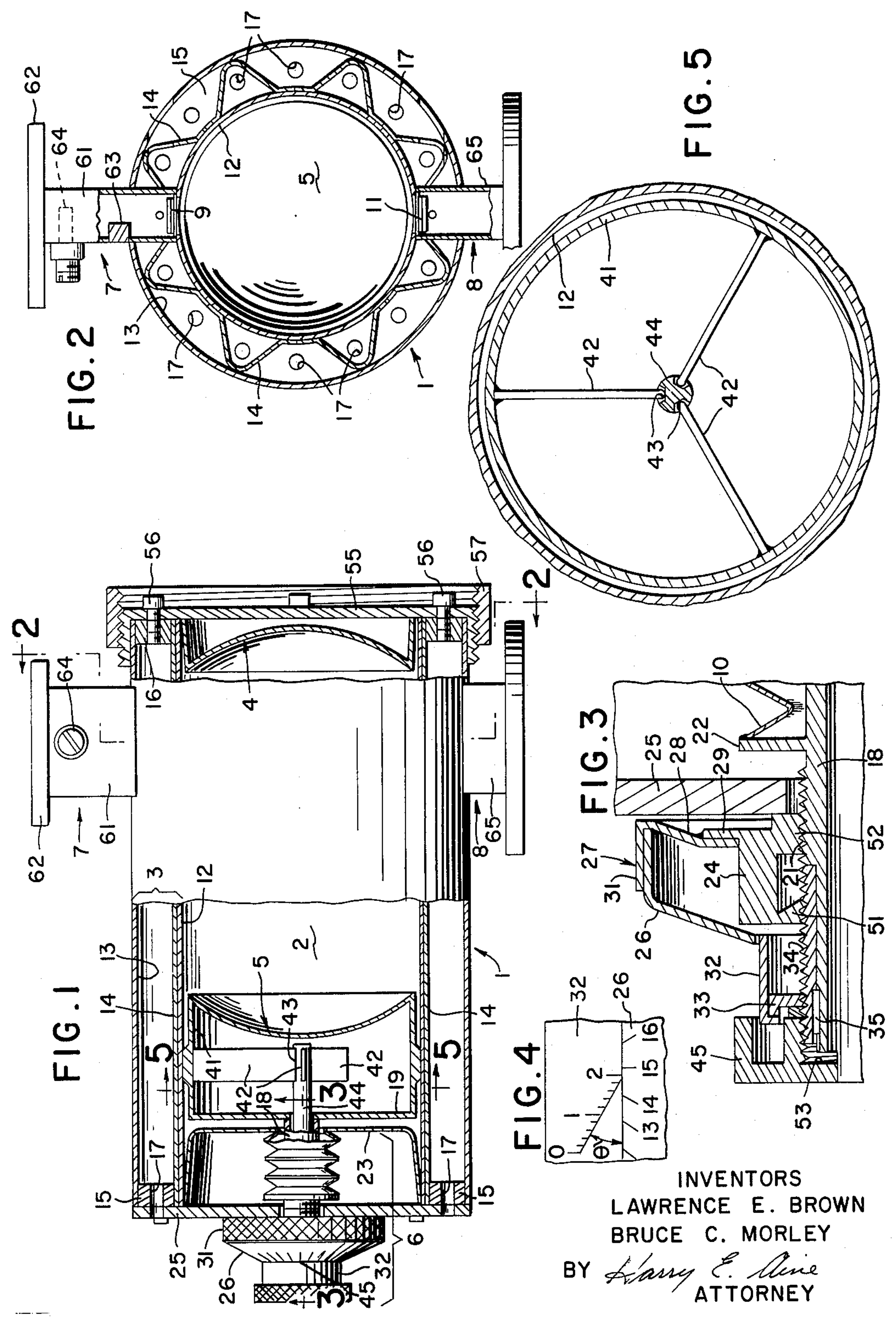

The present invention relates in general to cavity resonator apparatus and more specifically to a high Q tunable microwave cavity resonator useful, for example, as a stabilizing cavity for stabilizing the operating frequency of a reflex klystron oscillator, as a reference cavity in a frequency discriminator circuit, as a microwave filter and the like.

Heretofore high Q tunable microwave cavity resonators have been built and used for stabilizing reflex klystron oscillators and as reference cavities for frequency discriminator circuits. Typically these devices have employed a relatively thick walled chamber for mechanical strength to prevent unwanted frequency modulation produced by vibration of the cavity frequency determinative parts. In addition the frequency determinative parts were made of a low thermal expansion material such as, for example, Invar (36% nickel and 64% iron) to prevent drift of the cavity's resonant frequency with temperature changes of the ambient environment. Such cavities generally are designed to operate in a circular electric dominant mode for high Q-operation as of Q=40,000.

Such cavities are required to be stable in frequency to one part in 10,000 centered for example at 6 gc. over an ambient temperature range of 0° C. to 100° C. In addition, the cavity should be tunable over a 2% range with tuning resettability to ±0.01% or approximately ±1 mc. at 6 gc. Moreover the cavity and tuner mechanism should be nonresponsive to vibration.

At X band frequency, cavity tuners have been locked by constricting the cavity side wall against a side wall of a tuning plate movable within the cavity. However when such a device is used at lower C band frequencies the thickness of the cavity walls, as required for sufficient rigidity, becomes too great to be easily constricted and thus other means are desired.

In the present invention a cam operated spoke structure is disposed inside of the movable tuning wall. Actuation of the cam device expands the spoke structure operable upon the tuning wall to expand same outwardly against the side wall of the cavity chamber effecting a mechanical friction lock of the movable wall within the cavity resonator. This mechanism has greatly reduced the size and weight of the tuning locking mechanism and effectively renders the tuning mechanism non-responsive to moderate to severe vibrational environments.

The principal object of the present invention is to provide an improved microwave cavity resonator useful as a stabilizing cavity, as a reference cavity or the like.

One feature of the present invention is the provision of novel cavity tuner locking mechanism which selectively outwardly expands the tuner wall structure into frictional locking relationship with the rigid side walls of the cavity chamber for locking the tuner in a non-microphonic manner.

Another feature of the present invention is the provision of a hollow cavity tuning wall structure with its hollow interior in gas communication with the outside of the evacuated cavity resonator such that the atmospheric pressure tending to push the movable tuning wall into the evacuated cavity serves to provide a frictional loading on the tuner activating mechanism.

Figure 6B:
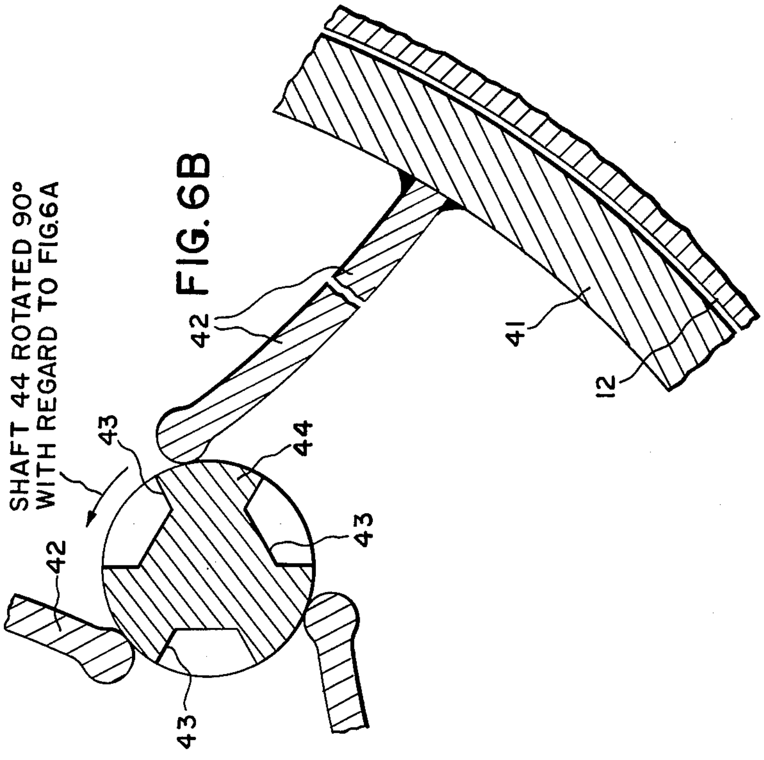
Figure 6A:
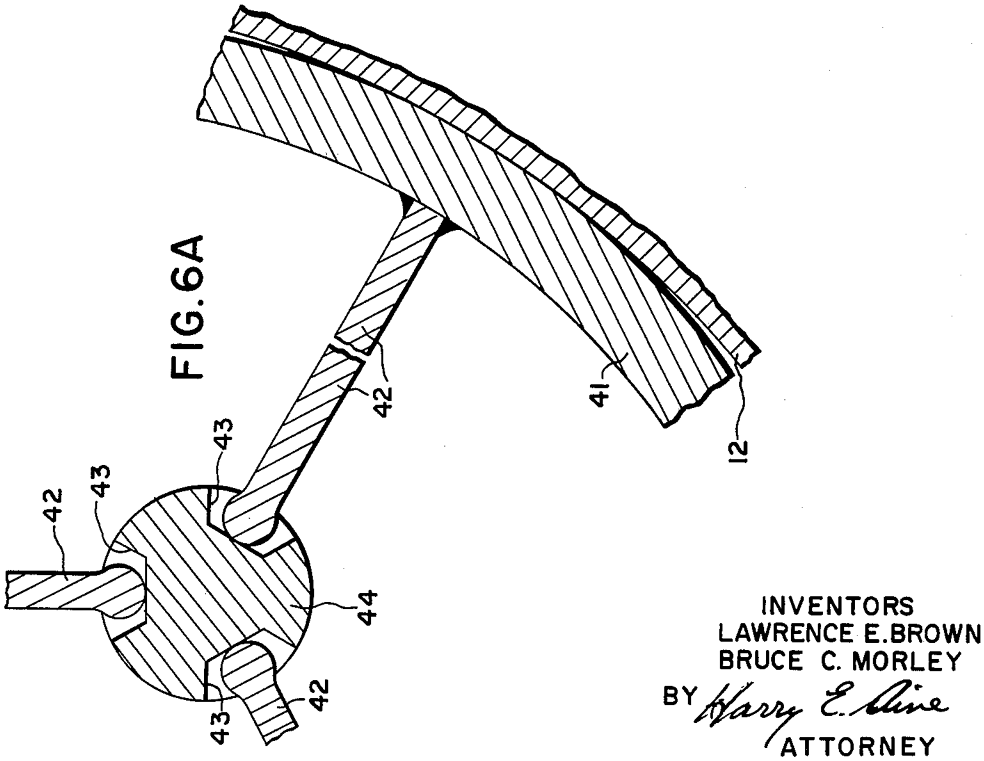

These and other features and advantages of the present invention will be more apparent after a perusal of the following specification taken in connection with the accompanying drawings wherein the same numeral is used in the various figures for the same or analogous element, and:

FIG. 1 is a longitudinal cross sectional view of a cavity resonator embodying the novel features of the present invention, FIG. 2 is a transverse cross sectional view of the structure of FIG. 1 taken along line 2—2 in the direction of the arrows, FIG. 3 is an enlarged fragmentary view of a portion of the structure of FIG. 1 delineated by line 3—3, FIG. 4 is a schematic drawing illustrating reading of the expanded micrometer scale feature of the present invention, FIG. 5 is an enlarged cross sectional view of a portion of the structure of FIG. 1 taken along line 5—5 in the direction of the arrows, and FIGS. 6A and 6B are enlarged views of FIG. 5 depicting the mode of operation of the tuner lock.

Referring now to FIGS. 1 and 2 there is shown in cross section a cavity resonator embodying the features of the present invention. A hollow metallic chamber 1 encloses a cylindrical resonant cavity chamber 2 defined by and bounded by the inner wall surfaces of a cylindrical side wall 3 and a pair of outwardly domed end walls 4 and 5, respectively. One end wall 5 is made movable axially of the cylindrical resonant chamber 2 for tuning thereof. A tuner actuating mechanism 6 mechanically interconnects to the movable wall 5 for effecting movement thereof and extends outwardly of the hollow chamber 1 from the upper end thereof.

A pair of port terminals 7 and 8 form the input and output terminals, respectively, of the cavity resonator 2 for applying wave energy to the cavity and for abstracting wave energy therefrom. When used as a reference cavity as opposed to use as a stabilizing cavity only a single port terminal may suffice for both an input and output terminal.

A pair of wave permeable gas tight R.F. window members 9 and 11 as of alumina ceramic are sealed across the input and output terminals. A metallic bellows or flexible partition as of stainless steel is sealed around the movable tuner actuating mechanism between the movable tuning mechanism and the inner wall of the chamber 1 for providing a flexible wall portion. The chamber 1 is evacuated in use to a low pressure as of $10^{-6}$ mm. Hg.

The cylindrical side wall 3 of the hollow chamber 1 is made of an integral composite sandwich construction. A pair of coaxially disposed spaced thin walled cylinders 12 and 13 as of 0.050" thick Invar form the inner and outer wall structure, respectively. In a typical example at C band the inner cylinder 12 has an inside diameter of 3.126" and the outer cylinder 13 has a diameter of 4.375". Both cylinders have a length of 7.682".

A corrugated reinforcing structure 14 is sandwiched between the inner and outer wall cylinders 12 and 13. The corrugated structure is formed by a plurality of longitudinally directed V-shaped cross section channels as of 0.050" thick Invar, closely fitted together around the outer periphery of the inner wall 12 to form the composite corrugated reinforcing structure. The ridges of the corrugations abut the inner surface of the outer cylinder 13 and are directed longitudinally of the chamber 1 parallel to the axis of revolution of the cavity resonantor 2.

A pair of plate-like rings 15 and 16 as of Invar close off the annular space between cylinders 12 and 13 and are disposed at the opposite ends of the cylindrical wall 3. A plurality of peripherally spaced axially directed bores 17 pass through the rings 15 and 16 to permit free gas communication between the annulus between the walls 12 and 13 and the outside atmosphere. During manufacture of the composite sandwiched wall 3, the end rings 15 and 16, inner and outer cylinders 12 and 13, and the corrugated reinforcing structure 14 are all brazed together in a furnace at elevated temperature. The bores 17 prevent setting up of excessive gas pressure in the annulus of the wall 3 which might otherwise explode the wall because of trapping of gas therein.

The composite wall 3 forms a rigid, light weight structure performing electrically and mechanically in every way as well as prior solid Invar walls. This construction reduces the weight of a typical C band cavity wall 3 with terminals 7 and 8 from 15 pounds to 4 pounds and also effects a considerable economy in material cost. This sandwich wall construction forms the subject matter of and is claimed in copending U.S. application Serial No. 271,440 filed April 8, 1963 and assigned to the same assignee as the present invention.

The tuner assembly 6 is disposed at the one end of the chamber 1 and serves to move the outwardly domed tuning wall 5 axially of the cavity resonator 2. The movable wall 5 is formed by a hollow tubular member of relatively thin walled construction as of 0.050″ wall thickness Invar.

A hollow tubular shaft 18 as of stainless steel is vacuum sealed at its inner end to the margin of a centrally disposed opening in a back wall 19 as of Invar of the hollow movable wall 5. The shaft 18 extends outwardly of the chamber 1 and is provided with external threads midway of its length at 21 (see FIG. 3). A radially directed flange 22 of the shaft 18 is vacuum sealed as by brazing to the bellows 10 which in turn is sealed to the inside wall 12 of the chamber 1 via the intermediary of an inwardly domed wall 23 as of 0.050″ thick Invar. Thus the vacuum envelope of the chamber 1 is completed through the intermediaries of walls 12, 23, bellows 10, shaft 18, and walls of the hollow movable tuning wall 5.

A nut 24 as of stainless steel is threaded over the threaded portion 21 of the hollow shaft 18. A centrally apertured end plate 25 as of stainless steel is bolted to the end of the chamber 1. The nut 24 is captured on the shaft 18 by bearing against the end plate 25 on its innermost face and by the spring biasing force exerted on the nut 24 through the intermediary of the threads 21 as derived from the air pressure operation upon the inside of the hollow tuning wall 5 tending to axially collapse the bellows 19 against the vacuum pressure inside the cavity resonator 2. The shaft 18 is captured against rotation by the bellows 10 and wall 23.

Rotation of the nut 24 causes the hollow shaft 18 and the mechanically interdependently linked movable tuning wall 5 to move axially of the resonant chamber 2 for tuning thereof.

A pair of cooperative micrometer-like graduated scales, one carried from the nut 24 and the other carried from the shaft 18, serves to measure the degree of penetration of the movable wall 5 into the chamber 1 and therefore serves as a measure of the resonant frequency of the cavity resonator 2. A calibration chart (not shown) is used to convert scale readings to frequency.

The rotating graduated scale is inscribed upon the exterior surface of an inwardly directed lip portion 26 as of aluminum of a composite cup member 27. The cup 27 is fixedly secured as by brazing to the nut 24 at the margin of a central opening in the bottom 28 of the cup 27, which margin abuts a collar 29 of the nut 24. The exterior side wall of the cup 27 is knurled at 31 for ease of gripping and turning. The rotatable graduated scale is directed in a line of development around the lip 26 of the cup 27 in the transverse plane of rotation of the nut 24. The scale is marked in graduations of 0–19 around the lip as seen also in FIG. 4.

The other non-rotatable scale is inscribed upon the exterior surface of a hollow cylindrical hub member 32 as of aluminum. The hub is mechanically interdependently linked to and moves axially with the shaft 18. The mechanical connection between the hub 32 and the shaft 18 is made via the intermediary of fixedly connected ring 33 and threaded sleeve 34 as of stainless steel. The sleeve 34 is in turn keyed to the shaft 18 via key 35.

The shaft carried graduated scale is layed out along a line of development inclined at an acute angle $\theta$ to the plane of rotation of the rotatable scale (see FIG. 4). The inclined scale increases the space between graduations of the non-rotatable scale as compared to the space between similar graduations if they were inscribed with a vertically directed line of development, as has been customary heretofore when using micrometer-like scales. For example the space between graduations on the inclined scale may be doubled if the angle $\theta$ is equal to 30°.

The scale is read by adding the reading of the rotatable scale, at the point of scale intersection, to the next lowest significant graduation on the inclined scale. For example, the total reading, as exemplified in FIG. 4, is 194.6 obtained by adding 180.0 from the inclined scale to 14.6 of the rotatable scale. In a preferred embodiment the threads on the nut 24 and shaft 18 are chosen to yield 0.020″ axial travel of the shaft 18 for each revolution of the nut 24. Hence 0.020″ corresponds to the axial distance between the smallest graduations of the inclined scale. The graduations on the rotatable scale then correspond to 0.001″ and can be interpolated to 0.0001″. This inclined scale arrangement forms the subject matter of and is claimed in copending U.S. application Serial No. 271,440 referred to hereinabove.

In the case of a typical C band cavity resonator, with scales layed out as aforementioned, the frequency is readable without magnification to ±35 kc. with the inclined scale extending over a quarter of the periphery around the hub 32. Two tuner locking mechanisms are provided for locking the movable tuning wall 5 in poistion against inadvertent movement via nut 24 and against movement under environments of shock and vibration.

A first tuner lock operates upon the side wall 41 of the hollow tuning wall 5 to selectively forceably bow the tuner side wall 41 outwardly against the adjacent inner surface of the inner cylindrical cavity side wall 12 to provide a friction lock for the hollow movable wall 5.

More specifically, a plurality of vane-like spokes 42 as of 0.050″ thick Invar are brazed at their outer ends to the inside surface of tuner side wall 41. The inner ends of the radially directed spokes 42 each ride within axially directed cam slots 43 in a cam shaft 44 as of stainless steel. The cam shaft 44 extends axially outwardly of the chamber 1 coaxially of and through the hollow interior of the tuner shaft 18.

A knurled nut 45 as of stainless steel is fixedly secured to the cam shaft 44 as by being pinned thereto. The nut serves as a knob for turning the cam shaft 44 causing the outermost ends of the radially directed spokes 42 to move radially outwardly of the movable tuning wall 5 as the cam slots, at the inner ends of the spokes 42, revolve into angular registry with the outer ends of the spokes 42.

Outward movement of the spoke outer ends radially expands as of 0.005″ the movable tuner wall 41 against the closely spaced as of 0.003″ cavity wall 12 forming a rigid frictional lock. This first locking mechanism is so non-microphonic that R.M.S. frequency deviation of the cavity produced by a vibrational environment in the worst orientation of 1 $g$ between 5 c.p.s. and 33 c.p.s. is less than 200 R.M.S. c.p.s. at C band.

The second tuner locking mechanism serves to lock the actuating nut 24 against inadvertent movement thereof by selectively producing a high frictional load on the threads of the nut 24. More specifically, the nut 24 is provided with a central recess in its internal threads dividing the threads into two axially spaced threaded regions 51 and 52, respectively. The outer region 52 threadably mates with the external threads on the sleeve 34.

The knurled nut 45 affixed to the end of the cam shaft 44 also threadably mates with the threads of the sleeve 34. Rotation of the nut 45 to lock the tuner wall 5 also causes the nut 45 to travel down the tuner shaft 18 until the internal shoulder of the nut at 53 engages the end of the tuner shaft 18 thereby stopping axial movement of the nut 45. Further rotation of the nut pulls the sleeve 34 toward the shoulder 53 thereby frictionally loading the threads 51 and 52 of the nuts 24 and 45 producing a frictional lock thereof thereby preventing further rotation of the cam shaft 44. In a preferred embodiment the parts are dimensioned such that a quarter turn of the nut 45 performs both of the aforementioned shaft and tuning wall locking functions. See FIGS. 6A and 6B for a more complete diagram showing the positions of the cam shaft 44 and spokes 42 for the locked and unlocked poistions.

The fixed end wall 4 as of Invar of the resonator chamber 2 is vacuum sealed at the outer periphery of its frustro conical stainless steel collar to the inside wall 12 of the chamber 1 as by Heliarc welding. A cover plate 55 is affixed over the end wall 4 by screws 56 inserted through the plate into tapped holes in the end ring 16. The outer periphery of the cover plate 55 is threaded to receive a threaded collar 57 for also threadably mating with a cavity holding fixture, not shown, to readily permit adjustment in the height of the port terminals 7 and 8 with respect to the holding fixture.

The input terminal 7 includes a hollow rectangular waveguide 61 as of Invar disposed in registry with the input R.F. window 9. An input flange 62 as of copper connects to a reflex klystron oscillator, not shown. A pair of capacitive phase adjusting posts 63 and 64 are provided extending into the input waveguide 61 from the broad wall thereof. The posts 63 and 64 adjust the effective electrical length of the guide between the cavity resonator 2 and the reflex klystron for impedance matching. One of the posts 64 is made adjustable and in a preferred embodiment is formed by a stainless steel screw threaded into the guide 61.

The input guide 61 is turned such that the electric field vector of the wave energy in the guide 61 is in alignment, at the input iris, with the electric field of the $TE_{0,1,3}$ mode within the cavity resonator 2 such that this mode will be excited.

The output terminal 8 includes an output rectangular waveguide 65 disposed in registry with the output R.F. window 11 and with the electric field vector of the guide in alignment with the electric field of the $TE_{0,1,3}$ mode for abstracting energy from this mode for propagation to a suitable load, not shown.

A typical C band stabilization cavity resonator constructed as called for above is tunable over a 150 mc. range; provides an unloaded Q of 40,000 with a stability ratio of 30 with a 5 db insertion loss; is returnable to within ±50 kc.; and under vibration with a reflex klystron connected for stabilization its F-M noise in a 100 cycle band is less than 1 cycle R.M.S. deviation at modulation frequencies from 1 kc. to 100 kc.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A cavity resonator apparatus including, means forming a hollow chamber defining boundary walls for a cylindrical cavity resonator, means forming a hollow unitary movable tuning plunger operable within said chamber and having a dished face defining an axially movable wall portion of said cylindrical cavity resonator for tuning thereof, said hollow plunger having relatively thin walled unitary side wall portions substantially axially coextensive with said movable tuning plunger and being radially deformable, tuner locking means accessible from the outside of said hollow chamber means and operable within said hollow tuning plunger and upon said relatively thin and deformable side wall portions thereof for selectively expanding and deforming said relatively thin side wall portions of said hollow tuning plunger outwardly against said hollow chamber means for selectively frictionally locking said hollow movable tuning plunger means to said hollow chamber means in a substantially non-microphonic manner.

2. A cavity resonator apparatus including: means forming a hollow chamber defining boundary walls for a cylindrical cavity resonator; means forming a uintary movable wall operable within said chamber and defining an axially movable wall portion of said cylindrical cavity resonator for tuning thereof; tuner locking means accessible from the outside of said hollow chamber means and operable upon said unitary movable tuning wall means for selectively expanding and deforming relatively thin walled portions of said movable tuning wall means outwardly against said hollow chamber means for selectively frictionally locking said movable wall means to said hollow chamber means; and said tuner locking means including, a cam shaft extending outwardly of said chamber means, a spoke structure radially movable of said chamber means and mechanically interdependently linked to said movable wall means, said cam shaft being mechanically interdependently linked to said spoke structure such that certain movement of said cam shaft causes said spoke structure to move toward a wall of said chamber means and to outwardly deform said movable wall tuning means against said chamber means serving to frictionally lock said movable tuning wall means to said chamber means.

3. The cavity resonator according to claim 2 wherein said movable tuning wall means includes a hollow movable wall structure, and said spoke structure is disposed internally of said hollow movable wall structure, and said cam shaft extends axially of and into said hollow movable wall structure with said spoke structure radially disposed thereof, and means for rotating said cam shaft from a point of access external of said hollow chamber for radially expanding said hollow movable wall via the intermediary of said spoke structure outwardly against said hollow chamber to frictionally lock said movable wall.

4. The cavity resonator apparatus according to claim 3 including a flexible gas-tight partition sealing said hollow movable wall structure to said hollow chamber means for movement of said movable wall while maintaining gas-tight integrity of said cavity resonator, and said cavity resonator being evacuated.

5. The cavity apparatus according to claim 4 including a hollow shaft mechanically interdependently linked to and in gas communication with the hollow interior of said movable tuning wall structure, said hollow shaft extending outwardly of said chamber for access externally of said chamber means for effecting movement of said movable wall structure from outside of said chamber means, and the hollow of said shaft forming a gas communication path from the exterior of said chamber to the interior of said hollow movable wall structure for allowing atmospheric pressure external of said chamber means to be applied to said movable wall to form a spring bias force on said movable wall urging same inwardly of said evacuated resonant cavity.

6. The cavity resonator apparatus according to claim 5 including screw means for effecting movement of said movable wall via the intermediary of said hollow shaft, and the spring bias force on said hollow movable wall being transmitted to said screw means for frictionally loading same.

References Cited by the Examiner

UNITED STATES PATENTS

| | | | |
|---|---|---|---|
| 247,896 | 10/81 | Ellis et al. | 192—75 |
| 2,528,387 | 10/50 | Niessen | 333—83 |
| 2,901,070 | 8/59 | Hansen | 192—76 |
| 3,119,082 | 1/64 | St. Clair et al. | 333—83 |

FOREIGN PATENTS

| | | |
|---|---|---|
| 33/5464 | 7/58 | Japan. |

ELI LIEBERMAN, *Primary Exmainer.*

HERMAN K. SAALBACH, *Examiner.*